United States Patent
McLeod et al.

(10) Patent No.: US 7,097,794 B2
(45) Date of Patent: Aug. 29, 2006

(54) VEHICULAR STRUCTURAL MEMBERS AND METHOD OF MAKING THE MEMBERS

(75) Inventors: David G. McLeod, Rochester, MI (US); Frank V. Billotto, Oakland, MI (US); Steve B. Swartzmiller, Clarkston, MI (US); Mark P. Allen, Bruce Township, MI (US); Christopher A. Brewster, Sterling Heights, MI (US); Kousay M. Said, Birmingham, MI (US)

(73) Assignee: Dow Global Technologies, Inc., Midland, MI (US)

( * ) Notice: Subject to any disclaimer, the term of this patent is extended or adjusted under 35 U.S.C. 154(b) by 443 days.

(21) Appl. No.: 10/414,069

(22) Filed: Apr. 15, 2003

(65) Prior Publication Data

US 2003/0194548 A1 Oct. 16, 2003

Related U.S. Application Data

(60) Provisional application No. 60/373,088, filed on Apr. 15, 2002.

(51) Int. Cl.
*B29C 44/06* (2006.01)

(52) U.S. Cl. ............... 264/46.5; 264/46.6; 264/275

(58) Field of Classification Search ............... 264/46.5, 264/46.6, 275, 278
See application file for complete search history.

(56) References Cited

U.S. PATENT DOCUMENTS

| | | | |
|---|---|---|---|
| 2,866,744 A | 12/1958 | Askey et al. | 208/65 |
| 3,581,681 A | 6/1971 | Newton | 108/51 |
| 3,755,212 A | 8/1973 | Dunlap et al. | 260/2.5 BD |
| 3,821,130 A | 6/1974 | Barron et al. | 260/2.5 BD |
| 3,849,146 A | 11/1974 | Walters et al. | 96/107 |
| 3,859,162 A | 1/1975 | Johnson et al. | 428/318.6 |
| 4,017,117 A | 4/1977 | Eggert et al. | 296/146.6 |
| 4,019,301 A | 4/1977 | Fox | 52/725 |
| 4,390,645 A | 6/1983 | Hoffman et al. | 521/137 |
| 4,451,518 A | 5/1984 | Miura et al. | 296/146.6 |
| 4,751,249 A | 6/1988 | Wycech | 521/54 |
| 4,769,391 A | 9/1988 | Wycech | 521/54 |
| 4,813,690 A | 3/1989 | Coburn, Jr. | 277/205 |
| 4,874,650 A | 10/1989 | Kitoh et al. | 428/68 |

(Continued)

FOREIGN PATENT DOCUMENTS

DE   10163253 A1   12/2001

(Continued)

OTHER PUBLICATIONS

Derwent 2002-449608, JP 2002127938.

(Continued)

*Primary Examiner*—Allan R. Kuhns

(57) ABSTRACT

The present invention is an article comprising a shaped rigid foam part; a heat activated foamable adhesive applied directly to at least a portion of the outer surface of the shaped foam part and an integral locating means. A second aspect of the invention is a method of forming a foam filled vehicle hollow member comprising, (a) inserting into a vehicular hollow member a rigid foam part comprised of a rigid foam having a heat activated foamable adhesive on at least a portion of the rigid foam insert and at least one integral locating means extending from a surface of the rigid foam, (b) engaging the locating means with the hollow member to locate the rigid foam part within the hollow member, and (c) heating the hollow member having the rigid foam part therein to a temperature and for a time sufficient to activate the heat activated expandable adhesive to form the foam filled vehicle hollow member.

17 Claims, 3 Drawing Sheets

U.S. PATENT DOCUMENTS

| | | | | |
|---|---|---|---|---|
| 4,898,630 A * | 2/1990 | Kitoh et al. | | 156/79 |
| 4,923,902 A | 5/1990 | Wycech | | 521/54 |
| 4,995,545 A | 2/1991 | Wycech | | 228/119 |
| 4,997,951 A | 3/1991 | Bagga | | 548/352 |
| 5,076,632 A | 12/1991 | Surratt | | 296/205 |
| 5,102,188 A | 4/1992 | Yamane | | 296/203.03 |
| 5,194,199 A | 3/1993 | Thum | | 264/46.6 |
| 5,213,391 A | 5/1993 | Takagi | | 296/205 |
| 5,218,792 A | 6/1993 | Cooper | | 296/203.03 |
| 5,266,133 A | 11/1993 | Hanley et al. | | 156/71 |
| 5,344,208 A | 9/1994 | Bien et al. | | 296/187 |
| 5,373,027 A | 12/1994 | Hanley et al. | | 521/84.1 |
| 5,506,025 A | 4/1996 | Otto et al. | | 428/98 |
| 5,533,781 A | 7/1996 | Williams | | 296/204 |
| 5,545,361 A | 8/1996 | Rosasco | | |
| 5,575,526 A | 11/1996 | Wycech | | 296/205 |
| 5,609,385 A | 3/1997 | Daniel | | 296/203.01 |
| 5,648,401 A | 7/1997 | Czaplicki et al. | | 521/85 |
| 5,660,428 A | 8/1997 | Catlin | | 296/203.01 |
| 5,678,826 A | 10/1997 | Miller | | 277/1 |
| 5,720,510 A | 2/1998 | Daniel et al. | | 296/203.01 |
| 5,725,272 A | 3/1998 | Jones | | 296/208 |
| 5,755,486 A | 5/1998 | Wycech | | 296/188 |
| 5,766,719 A | 6/1998 | Rimkus | | 428/71 |
| 5,806,919 A | 9/1998 | Davies | | 296/205 |
| 5,857,734 A | 1/1999 | Okamura et al. | | 296/187.12 |
| 5,866,052 A | 2/1999 | Muramatsu | | 264/46.6 |
| 5,871,253 A | 2/1999 | Erber | | 296/146.6 |
| 5,882,567 A * | 3/1999 | Cavallaro et al. | | 264/255 |
| 5,884,960 A | 3/1999 | Wycech | | 296/146.6 |
| 5,888,600 A | 3/1999 | Wycech | | 428/35.9 |
| 5,932,680 A | 8/1999 | Heider | | 528/59 |
| 5,968,995 A | 10/1999 | Rizk et al. | | 521/159 |
| 5,985,435 A | 11/1999 | Czaplicki et al. | | 428/323 |
| 6,003,274 A | 12/1999 | Wycech | | 52/232 |
| 6,040,350 A | 3/2000 | Fukui | | 521/135 |
| 6,050,579 A | 4/2000 | Selland et al. | | 296/204 |
| 6,058,673 A | 5/2000 | Wycech | | 52/721.4 |
| 6,062,624 A | 5/2000 | Crabtree et al. | | 296/39.3 |
| 6,068,424 A | 5/2000 | Wycech | | 403/269 |
| 6,079,180 A | 6/2000 | Wycech | | 296/203.01 |
| 6,092,862 A | 7/2000 | Kuwahara | | 296/204 |
| 6,092,864 A | 7/2000 | Wycech et al. | | 296/204 |
| 6,096,403 A | 8/2000 | Wycech | | 428/122 |
| 6,099,948 A | 8/2000 | Paver | | 428/304.4 |
| 6,131,897 A | 10/2000 | Barz et al. | | 269/207 |
| 6,135,542 A | 10/2000 | Emmelmann et al. | | 296/203.01 |
| 6,146,565 A | 11/2000 | Keller | | 264/46.5 |
| 6,146,566 A | 11/2000 | Beeck et al. | | 264/101 |
| 6,149,227 A | 11/2000 | Wycech | | 296/188 |
| 6,150,428 A | 11/2000 | Hanley, IV et al. | | 521/135 |
| 6,164,716 A | 12/2000 | Palazzolo et al. | | 296/146.6 |
| 6,165,588 A | 12/2000 | Wycech | | 428/122 |
| 6,168,226 B1 | 1/2001 | Wycech | | 298/146.6 |
| 6,189,953 B1 | 2/2001 | Wycech | | 296/188 |
| 6,196,619 B1 | 3/2001 | Townsend et al. | | 296/146.6 |
| 6,199,940 B1 | 3/2001 | Hopton et al. | | 296/187 |
| 6,218,442 B1 | 4/2001 | Hilborn et al. | | 521/85 |
| 6,233,826 B1 | 5/2001 | Wycech | | 29/897.1 |
| 6,237,304 B1 | 5/2001 | Wycech | | 52/731.6 |
| 6,247,287 B1 | 6/2001 | Takabatake | | 52/731.6 |
| 6,253,524 B1 | 7/2001 | Hopton et al. | | 52/731.2 |
| 6,270,600 B1 | 8/2001 | Wycech | | 156/79 |
| 6,272,809 B1 | 8/2001 | Wycech | | 52/731.6 |
| 6,276,105 B1 | 8/2001 | Wycech | | 52/309.8 |
| 6,281,260 B1 | 8/2001 | Hanley, IV et al. | | 521/135 |
| 6,286,896 B1 | 9/2001 | Eipper et al. | | 296/189 |
| 6,287,666 B1 | 9/2001 | Wycech | | 428/122 |
| 6,296,298 B1 | 10/2001 | Barz | | 296/187 |
| 6,305,136 B1 | 10/2001 | Hopton et al. | | 52/309.7 |
| 6,308,999 B1 | 10/2001 | Tan et al. | | 293/109 |
| 6,311,452 B1 | 11/2001 | Barz et al. | | 52/735.1 |
| 6,332,731 B1 | 12/2001 | Wycech | | 403/171 |
| 6,341,467 B1 | 1/2002 | Wycech | | 52/721.4 |
| 6,346,573 B1 | 2/2002 | White | | 525/121 |
| 6,348,513 B1 | 2/2002 | Hilborn et al. | | 521/95 |
| 6,357,819 B1 | 3/2002 | Yoshino | | 296/189 |
| 6,376,564 B1 | 4/2002 | Harrison | | 521/54 |
| 6,378,933 B1 | 4/2002 | Schoen et al. | | 296/203.02 |
| 6,387,470 B1 | 5/2002 | Chang et al. | | 428/121 |
| 6,406,078 B1 | 6/2002 | Wycech | | 293/120 |
| 6,413,611 B1 | 7/2002 | Roberts et al. | | 428/99 |
| 6,419,305 B1 | 7/2002 | Larsen | | 296/203.03 |
| 6,422,575 B1 | 7/2002 | Czaplicki et al. | | 277/628 |
| 6,423,755 B1 | 7/2002 | Allen et al. | | 521/111 |
| 6,451,231 B1 | 9/2002 | Harrison et al. | | 264/45.3 |
| 6,455,126 B1 | 9/2002 | Wycech | | 428/122 |
| 6,455,144 B1 | 9/2002 | Wycech | | 428/308.4 |
| 6,467,834 B1 | 10/2002 | Barz et al. | | 296/187 |
| 6,471,285 B1 | 10/2002 | Czaplicki et al. | | 296/188 |
| 6,474,722 B1 | 11/2002 | Barz | | 296/187 |
| 6,474,723 B1 | 11/2002 | Czaplicki et al. | | 296/188 |
| 6,475,577 B1 | 11/2002 | Hopton et al. | | 428/34.7 |
| 6,478,367 B1 | 11/2002 | Ishikawa | | 296/203.03 |
| 6,482,486 B1 | 11/2002 | Czaplicki et al. | | 428/36.91 |
| 6,494,525 B1 | 12/2002 | Blank | | 296/187 |
| 6,502,821 B1 | 1/2003 | Schneider | | 276/146.6 |
| 6,519,854 B1 | 2/2003 | Blank | | 29/897.1 |
| 6,546,693 B1 | 4/2003 | Wycech | | 52/790.1 |
| 6,550,847 B1 | 4/2003 | Honda et al. | | 296/146.6 |
| 6,561,571 B1 | 5/2003 | Brennecke | | 296/187 |
| 6,573,309 B1 | 6/2003 | Reitenbach et al. | | 521/135 |
| 6,575,309 B1 | 6/2003 | Chiga | | 210/435 |
| 6,607,238 B1 | 8/2003 | Barz | | 296/187 |
| 6,619,727 B1 | 9/2003 | Barz et al. | | 296/203.02 |
| 6,630,221 B1 | 10/2003 | Wong | | 428/117 |
| 6,649,243 B1 | 11/2003 | Roberts et al. | | 428/99 |
| 6,668,457 B1 | 12/2003 | Czaplicki | | 29/897.1 |
| 6,739,641 B1 | 5/2004 | McLeod et al. | | 296/37.2 |
| 2001/0040388 A1 | 11/2001 | Barz | | 296/187 |
| 2002/0033617 A1 | 3/2002 | Blank | | 296/187 |
| 2002/0036338 A1 | 3/2002 | Matsuo et al. | | 257/686 |
| 2002/0053179 A1 | 5/2002 | Wycech | | 52/721.4 |
| 2002/0074083 A1 | 6/2002 | Ludin et al. | | 156/293 |
| 2002/0074827 A1 | 6/2002 | Fitzgerald et al. | | 296/188 |
| 2002/0094427 A1 | 7/2002 | Edwards et al. | | 428/297.4 |
| 2002/0096833 A1 | 7/2002 | Czaplicki et al. | | 277/316 |
| 2002/0115736 A1 | 8/2002 | Koshy | | 521/99 |
| 2002/0125739 A1 | 9/2002 | Czaplicki et al. | | 296/187 |
| 2002/0148198 A1 | 10/2002 | Wycech | | 52/790.1 |
| 2002/0160130 A1 | 10/2002 | Sheldon et al. | | 428/34.1 |
| 2002/0164450 A1 | 11/2002 | Lupini et al. | | 428/99 |
| 2002/0174954 A1 | 11/2002 | Busseuil et al. | | 156/349 |
| 2002/0178584 A1 | 12/2002 | Wycech | | 29/897.2 |
| 2002/0192387 A1 | 12/2002 | Agarwal et al. | | 427/407.1 |
| 2003/0001410 A1 | 1/2003 | Cate et al. | | 296/187 |
| 2003/0001469 A1 | 1/2003 | Hankins et al. | | 312/257.1 |
| 2003/0018095 A1 | 1/2003 | Agarwal | | 521/59 |
| 2003/0099826 A1 | 5/2003 | Juras et al. | | 428/343 |
| 2003/0102686 A1 | 6/2003 | McLeod et al. | | 296/37.2 |
| 2003/0102687 A1 | 6/2003 | McLeod et al. | | 296/37.2 |
| 2003/0127844 A1 | 7/2003 | Gloceri et al. | | 280/788 |
| 2003/0137162 A1 | 7/2003 | Kropfeld | | 296/203.01 |
| 2003/0184121 A1 | 10/2003 | Czaplicki et al. | | 296/187.02 |
| 2003/0209921 A1 | 11/2003 | Coon et al. | | 296/187.02 |

FOREIGN PATENT DOCUMENTS

| | | |
|---|---|---|
| EP | 0 827 473 B1 | 11/1996 |
| EP | 0 897 439 B1 | 11/1997 |
| EP | 0 899 300 A2 | 8/1998 |
| EP | 1 020 273 A1 | 7/2000 |
| EP | 1 364 862 A2 | 4/2003 |
| WO | WO 96/37400 * | 11/1996 |

| | | |
|---|---|---|
| WO | 99/08854 | 2/1999 |
| WO | 00/13876 | 3/2000 |
| WO | 00/27920 | 5/2000 |
| WO | 00/55444 | 9/2000 |
| WO | 01/19667 | 3/2001 |
| WO | 01/34453 A1 | 5/2001 |
| WO | 01/344553 | 5/2001 |
| WO | 01/41950 A2 | 6/2001 |
| WO | 01/41950 A3 | 6/2001 |
| WO | 01/54936 A1 | 8/2001 |
| WO | 01/55523 | 8/2001 |
| WO | 01/56845 A1 | 8/2001 |
| WO | 01/58741 | 8/2001 |
| WO | 01/68342 A1 | 9/2001 |
| WO | 01/68394 | 9/2001 |
| WO | 01/83206 | 11/2001 |
| WO | 01/41950 A2 | 12/2001 |
| WO | 02/12026 A1 | 2/2002 |
| WO | 02/24451 A1 | 3/2002 |
| WO | 02/26549 A1 | 4/2002 |
| WO | 02/26550 A1 | 4/2002 |
| WO | 02/31077 A2 | 4/2002 |
| WO | 02/31077 A3 | 4/2002 |
| WO | 02/36338 A1 | 5/2002 |
| WO | 02/49836 A1 | 6/2002 |
| WO | 02/074608 A1 | 9/2002 |
| WO | 02/074609 A1 | 9/2002 |
| WO | 02/087843 A1 | 11/2002 |
| WO | 02/088214 | 11/2002 |

OTHER PUBLICATIONS

Derwent 2003-124835, JP2002362412.
Derwent 2000-340652, EP 999119A2.
U.S. Appl. No. 10/794,909, Michelle Boven et al., filed Mar. 5, 2004, Structural Reinforcement Article and Process for Preparation Thereof.
Patent Abstracts of Japan, JP 59077973 (1984).

* cited by examiner

VEHICULAR STRUCTURAL MEMBERS AND METHOD OF MAKING THE MEMBERS

This application claims the benefit of U.S. Provisional application No. 60/373,088, filed Apr. 15, 2002.

BACKGROUND OF THE INVENTION

The present invention relates to lightweight inserts for improving the structural integrity or dampen the sound of vehicular structural members, such as a car's frame rail or pillar.

BACKGROUND

Reducing automotive vehicle weight is and continues to be important to meet ever more stringent fuel economy and environmental standards. All the while, automobiles are expected to be quieter and safer. To meet these contradictory desires, automotive engineers have introduced foams into vehicular cavities to primarily reduce noise (acoustic foams). These foams have generally been introduced into a hollow area of the structural member after the member has been formed. The foam has also been introduced by inserting a foamable material in the hollow member as the member is being formed and subsequently foaming the foamable material during, for example, E-coating.

Because foams have been difficult to locate precisely and contain within a certain area of a hollow structural member, from one vehicle to another, they have not been used for improving, for example, the rigidity of structural members. This inability to know exactly where the foam is and to what extent the foam fills the cavity leads to unpredictability and variability of the crash worthiness of one automobile to another. For example, crush zones designed into the structural member may contain unwanted foam resulting in excessive energy being delivered to a vehicle occupant in an accident, whereas a foam that does not sufficiently fill the cavity could result in a similar problem.

This uncontrolled foaming and filling of the cavities also leads to problems, such as foam escaping and clogging up functional holes, such as mounting holes for other components. Another problem is that if the foam is inserted in the manufacturing process and later foamed by the application of heat during E-coating, the foam may be foamed by the welding process used to make the cavity.

An example of a method of introducing a foam into a vehicular hollow member is described by U.S. Pat. No. 5,194,199 ('199 patent). In the '199 patent, a core of foam having a shell of polyurethane reactants encapsulated in a thermoplastic is described (heat foamable shell). The shell foams upon application of sufficient heat, such as during immersion coating. The core is introduced into a portion of the hollow member (e.g., beam having cross-section resembling a "C") that has joining members extending away from the core. The method requires local projections, such that the heat foamable shell of encapsulated polyurethane does not foam when the hollow member is completed by welding, for example, a face plate onto the C-like beam to form the hollow member.

In U.S. Pat. No. 5,678,826, a method of introducing a foam is described where a foamable material is located within the hollow member by a removable plug extending through the wall of the hollow member. After the foamable material is foamed during E-coating, the plug is removed. In EP 0 999 119 A2, a method of introducing a foam is described where the foam has drain channel entirely within the foam. Each of these prior art methods fail to address the problem of precisely locating and positioning the foam within the hollow member. In addition, they fail to address the problem of the foam plugging up holes in the hollow member used for mounting other items to the member or leaving pathways within the member for other items, such as wires that are accessible after the foam has been introduced into the hollow member.

Accordingly, it would be desirable to provide a method for introducing a foam into a hollow member of a vehicle that solves one or more of the problems of the prior art, such as one of those described above. It would also be desirable to provide a foamed insert that helps provide a method that solves one or more of the problems of the prior art, such as those described above.

SUMMARY OF THE INVENTION

Objects of this invention include, but are not limited to; (1) a method of inserting a rigid foam into a hollow member of a vehicle, such that the foam is precisely located within the hollow member, (2) a method of easily determining the presence of the foam within the hollow member, (3) a prefoamed insert that may be easily inserted into the hollow member and subsequently bound to the hollow member during E-coating heating, while not becoming adhesively bound during the formation (e.g., welding) of the hollow member, (4) a method of inserting a foam into a hollow member that does not plug up functional holes in the wall of the hollow member and (5) a method of forming channels between the foam and walls of the hollow member that can be used for drainage of the E-coating and also for conduits for mounting other vehicle hardware, such as brake lines or wires.

A first aspect of the invention comprises an article comprising a shaped rigid foam part; a heat activated foamable adhesive applied directly to at least a portion of the outer surface of the shaped foam part and an integral locating means.

A second aspect of the invention is a method of forming a foam filled vehicle hollow member comprising, (a) inserting into a vehicular hollow member a rigid foam part comprised of a rigid foam having a heat activated foamable adhesive on at least a portion of the rigid foam insert and at least one integral locating means extending from a surface of the rigid foam, (b) engaging the locating means with the hollow member to locate the rigid foam part within the hollow member, and (c) heating the hollow member having the rigid foam part therein to a temperature and for a time sufficient to activate the heat activated expandable adhesive to form the foam filled vehicle hollow member.

The present invention allows the insertion of a rigid foam part precisely within a vehicular hollow member, while also making it easier to determine in production that the foam is present within the hollow member (i.e., observation of the pin). The method of the invention is particularly useful in forming a structural body of a vehicle, such as the automobile frame rail. For example, it is quite common for frame rails of automobiles to have sections that are weakened to create crush zones to dissipate the energy of an accident and protect the occupants. The frame rails also support parts of the automobile like the transmission. The method allows for foam, such as polyurethane foam, to be introduced selectively into the frame rail without compromising the crush zone or clogging the mounting holes for other components, such as engines and transmission. The method may also be used to make other components of a vehicle, such as rocker panels, beams, pillars, crossbars, body mounts and the like. The method may also be used for other applications, such as athletic equipment, boats, bicycles, aircraft, trucks and trains.

DETAILED DESCRIPTION OF THE DRAWING

DETAILED DESCRIPTION

Figure 1:
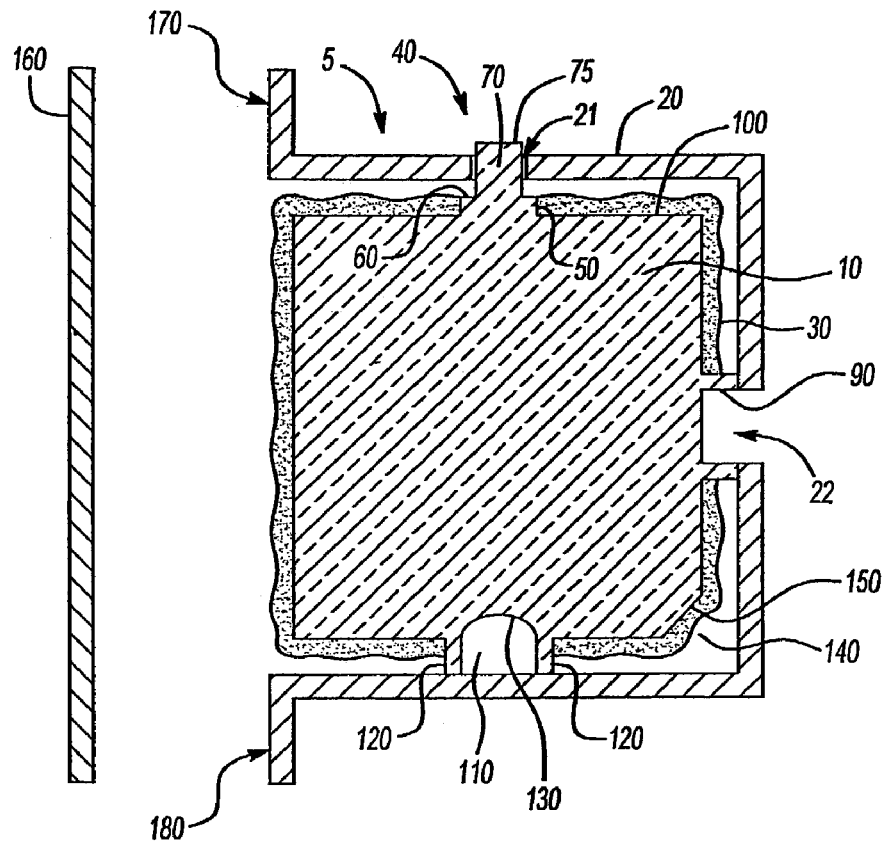
FIG. 1 is a cross-sectional view of the vehicular hollow member having the insert therein prior to enclosing the hollow member.

Hollow member as used herein means an empty cavity formed by the parts of the apparatus, such as an automobile, which cavity is typically enclosed. The apparatus may exhibit structural weakness at the point of the location of the hollow member. At least a portion with respect to the location of the adhesive on the shaped foam article means that the shaped foam article has adhesive on some or all of its outer surface. Integral locating means is a means for locating and holding the shaped part in the location it is meant to be placed wherein the locating means is integrated into the shaped part. The integral locating means can be a shaped indentation or protrusion made from the foam used to form the shaped part. Alternatively, the integral locating means is made of another material wherein a portion of the locating means is molded into the shaped foam part or permanently affixed post molding so as to permanently lock the integral locating means in place. The integral locating means can be a metal tab used to weld the part in place, a threaded insert adapted to receive a screw designed to hold the part in place. The integral locating means can be any part wherein a portion is molded in the rigid foam part and the portion outside of the part has a mechanical affixing means adapted for mechanically holding the part in a location, such as a snap fit clip or a clip. Mechanical affixing means is any known mechanical device used to hold a part in its proper location including a snap fit clip, bolt, screw or the like. All or a portion of the integral locating means can be a magnet. The integral locating means can also be a molded part which has a pressure sensitive adhesive on the external portion.

In one embodiment the integral locating means is a locating pin extending from a surface of the rigid foam. The locating pin can have a portion molded into the rigid foam insert or be formed from the rigid foam when the rigid foam insert is fabricated. Preferably, the hollow member has a matching locating hole that the locating pin fits in to locate the rigid foam insert in place. When the rigid foam insert is placed in the hollow member, the locating pin is inserted into the locating hole for the purpose of locating the rigid foam in the proper location.

The term "engaging" as used herein means using the locating means to place the rigid foam insert at the proper location in the hollow member. In a preferred embodiment, the locating means also can be used to hold the rigid foam insert in place either permanently or until the foamable adhesive expands to meet the walls of the hollow member and thereby hold the rigid foam insert in place. Engaging can also mean applying the integral locating means to hold the rigid foam insert in place. This can be achieved by welding metal tabs to the hollow member, placing a locating means having a pressure sensitive adhesive or magnet thereon in a position that the adhesive or magnet come into contact with the hollow member, or by applying the mechanically affixing means to proper part of the hollow member to hold the rigid foam insert in place. Where the integral locating means is a threaded receptacle for a screw, an external screw may be engaged. "Shaped" as used herein means having a three dimensional form adapted to fit into a hollow member. "Integral" as used in integral locating means, means that the locating means is not merely temporarily attached to the foam insert, but that it is attached such that, if it was removed, the locating means would either be broken or the insert foam would be damaged. Generally, this means that the locating means is a continuous part of the insert foam, the part is molded in the insert foam or is adhesively bonded to the insert foam.

In a preferred embodiment the invention is a method of forming a foam filled vehicle hollow member comprising, (a) inserting a rigid foam insert comprised of a rigid foam having a heat activated foamable adhesive on at least a portion of the rigid foam insert and at least one integral locating pin extending from a surface of the rigid foam into a vehicular hollow member having at least one hole, such that upon inserting, the locating pin of the insert is thrust in the hole in the hollow member resulting in the rigid foam insert being located and held within the hollow member, and (b) heating the hollow member having the rigid foam insert therein to a temperature and time sufficient to activate the heat activated expandable adhesive to form the foam filled vehicle hollow member.

In a preferred embodiment the invention is a method of forming a foam filled vehicle hollow member comprising, a) inserting a shaped rigid foam part comprising of a shaped rigid foam having a heat activated foamable adhesive on at least a portion of the rigid foam part and at least one integral locating means extending from a surface of the rigid foam part;

b) engaging the locating means of the rigid foam part with the hollow member to locate the rigid foam insert in the hollow member; and c) heating the hollow member having the rigid foam part therein to a temperature and time sufficient to activate the heat activated expandable adhesive to form the foam filled vehicle hollow member.

In a preferred embodiment the invention is a method wherein the locating means is a molded insert having threads adapted for receiving a screw and the rigid foam insert is engaged with the hollow member by inserting a screw through a hole in the hollow member and screwing the screw into the threaded insert.

In a preferred embodiment the invention is a method wherein the locating means is a metal tab and the rigid foam is engaged with the hollow member by welding or riveting the metal tabs to the hollow member.

Figure 2:
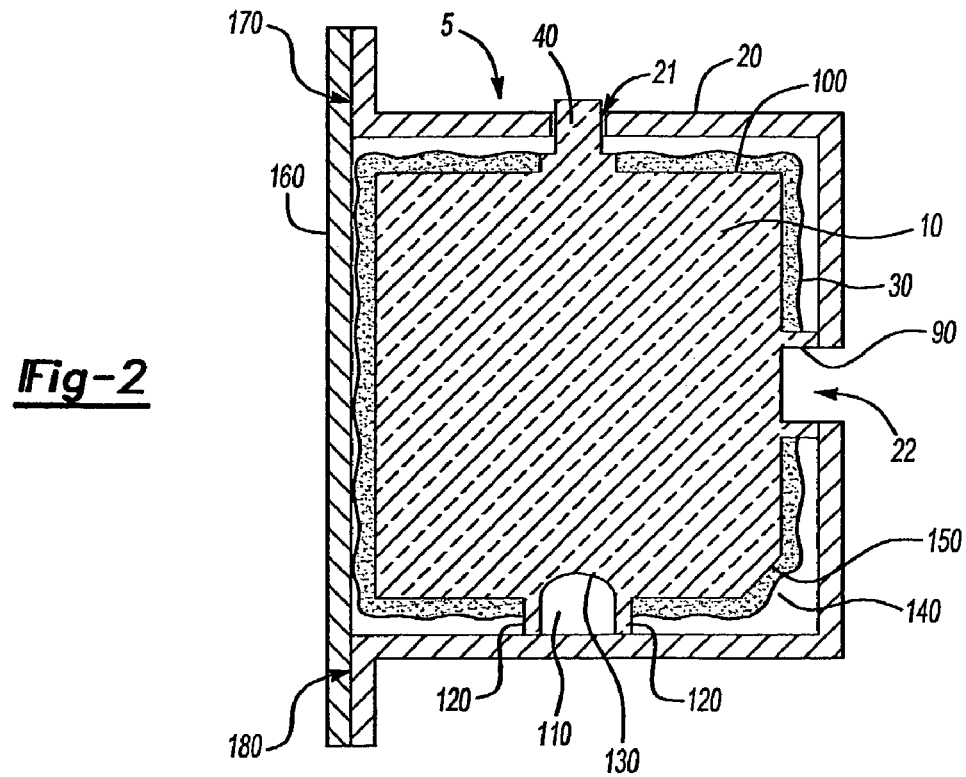
FIG. 2 is a cross-sectional view of the vehicular hollow member having the insert therein after enclosing the hollow member, but prior to expansion of the heat expandable adhesive.
Figure 3:
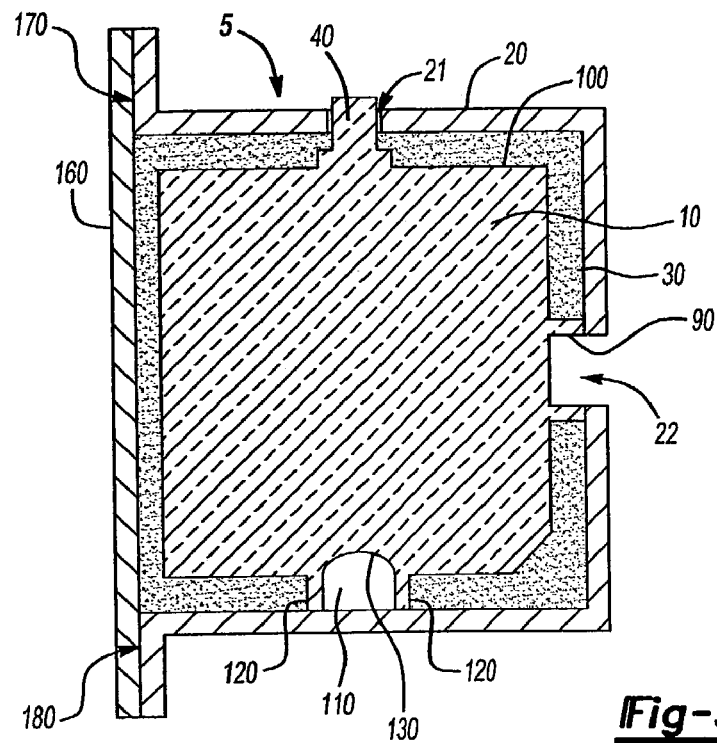
FIG. 3 is a cross-sectional view of the vehicular hollow member having the insert therein after expanding the heat expandable adhesive.

FIGS. 1–3 illustrate a specific embodiment of the invention and in no way limit the scope of the invention. Referring to the specific embodiment of FIG. 1, the foam filled vehicular member 5 is formed by inserting a rigid foam insert 10 into the cavity by metal wall 20 having locating hole 21 and mounting hole 22. The rigid foam insert 10 has a heat activated adhesive 30 thereon. The rigid core has at least one integral locating pin 40 extending from the surface 100 of the rigid foam insert 10. The locating pin 40 may be comprised of a locating base 50 having a base surface 60 and locating pinnacle 70 that extends through hole 21. The foam insert 10 may also have adhesive dam 90 that protects mounting hole 22 from being plugged by expandable adhesive 30 upon heating and expansion of said adhesive. The filled member 5 may also have conduit 110 defined by adhesive dam 120 foam, surface 130 and metal wall 20. The filled member may also have temporary drain channel 140 defined by foam insert surface 150 having adhesive 30 thereon and metal wall 20.

After insertion of the foam insert 10 into the hollow member defined by metal wall 20, metal wall 160 is placed onto metal wall 20 and welded at metal extension 170 and 180, as shown in FIG. 2. Subsequent to welding, the internal surfaces 190 are E-coated and upon heating during the E-coating process, adhesive 30 expands and forms the foam filled vehicular member 5 as shown in FIG. 3.

The insertion of insert foam 10 may be accomplished by any suitable way, such as placing it by hand into the cavity defined by metal wall 20, so long as locating pin 40 extends through locating hole 21. The integral locating pin 40 may be made of any material, but preferably is the same material as the foam insert 10. Preferably, the pin 40 and insert 10 are formed as a unit at the same time. The pin preferably has a base 50 and pinnacle 70. In this preferred embodiment of the pin 40, the adhesive 30 desirably has a thickness such that the adhesive is level with base surface 60. To facilitate location of foam insert 10, it is preferred that the base surface 60 has an adhesive thereon that adheres the insert 10 to metal wall 20 prior to heating and expansion of the expandable adhesive 30. The adhesive on base surface 60 may be any suitable adhesive for making bond between foam insert 10 and metal wall 20. The pin surface 75 may be painted a distinct color from metal wall 20 so that it is easily determined whether the foam insert 10 is within the vehicular member 5.

The integral locating pin 40 may be any suitable cross-sectional shape. For example, the cross-section of the pin may be a circle, elliptical, square, rectangle or any other useful polygonal shape.

The foam insert 10 may be any suitable foam material. The foam material will preferably have a density of from about 5 pounds per cubic feet (80 Kg/m$^3$) to about 25 pounds per cubic feet (400 Kg/m$^3$) if allowed to foam unconstrained. The particular foam chosen will depend upon the properties desired for the vehicular member. Preferably, the foam material is a polyurethane thermoset polymer foam. However, other structural filler material types can also be used, such as other thermoset and thermoplastic fillers including epoxies, polyurethane hybrids, such as polyisocyanate (polyisocyanurates) polyolefins, syndiotactics, composites, and other rigid foams. Non-plastic filler materials, such as aluminum foam, organic and non-organic (ceramic and metallic) foams can also used.

The foam insert 10 may be made by any suitable method, such as those known in the art for molding polymeric rigid or elastic foams. Illustratively, components typically will comprise a polymer or monomers and blowing agent. An example of a preferred embodiment is a foam produced from the combination of "A-side" and "B-side" components, which cure under ambient conditions. For example, the A-side may consist of isocyanate prepolymer or polymeric methylene diphenyl isocyanate (MDI) and the B-side may consist of a polyol blend nominally consisting of various polyols, surfactants, catalysts, and water. The foam may also contain fillers, such as glass beads, thixotropic additives and other composite fibers. Chemical or physical blowing agents or combinations thereof may be used. Single component foam systems can also be used, such as those described in U.S. Pat. Nos. 4,923,902 and 4,995,545, incorporated herein by reference. The foam insert may also be made using the method described in co-pending U.S. application Ser. No. 09/998,093, incorporated herein by reference.

The expandable adhesive 30 may be any suitable adhesive, such as those known in the art. It is desirable that the expandable adhesive 30 fails to be substantially activated, for example, by welding prior to E-coating. A typical expandable adhesive includes a polymeric base material, such as an epoxy resin or ethylene-based polymer which, when compounded with appropriate ingredients (typically a blowing and curing agent), expands and cures in a reliable and predictable manner upon the application of heat, such as during E-coating. The expandable adhesive will also cross-link upon curing or achieve its final shape, rendering the material incapable of further flow or shape change. Other useful materials include polyolefins, copolymers and terpolymers with at least one monomer type an alpha-olefin, phenol/formaldehyde materials, phenoxy materials, and polyurethane materials with high glass transition temperature, such as in U.S. Pat. Nos. 5,766,719, 5,755,486, 5,575, 526; 5,932,680, incorporated herein by reference. Preferably the expandable adhesive 30 is an epoxy resin or elastomeric adhesive, such as an Ethylene Propylene Diamine Monomer (EPDM) type adhesive, an example being ND 700, available from ND Industries Inc., Troy, Mich.

The expandable adhesive 30 may be applied to the outer face of the foam insert 10 in any manner, including dipping, laminating, brushing, rolling, co-extruding, injection molding, overmolding, spraying and the like. Additionally, the expandable adhesive 30 can be preformed or die-cut into pieces, which can be placed or adhered to the foam insert 10.

The foam insert 10 may also have adhesive dam 90 that protects mounting hole 22. Desirably, any dam present on foam insert 10 is formed from the foam material of the foam insert 10. These dams may be formed from another material after the insert has been formed using suitable material, such as synthetic plastics that are able to withstand the temperatures experienced during the manufacture of the vehicle without distorting and allowing the expandable adhesive 30 to seep by the dam. Examples include plastics, such as nylons, polycarbonates, polyesters, epoxy resins, phenol-formaldehyde resins and the like.

The foam insert 10 may also contain conduit 110 and temporary channel 130. These desirably are molded into foam insert 10, but may be formed subsequently by cutting or removing sections of the foam insert 10 mechanically. The temporary drain channel 130 is useful to drain, for example, the liquids used during E-coating. The conduit 110 is useful as a conduit for vehicle items that desirably are protected, such as wiring, gas lines, brake lines and the like.

The foam insert of the invention can be placed into the hollow member to improve the structural integrity of the apparatus, to prevent the transmission of sound or vibrations through the hollow member or both.

Figure 4:
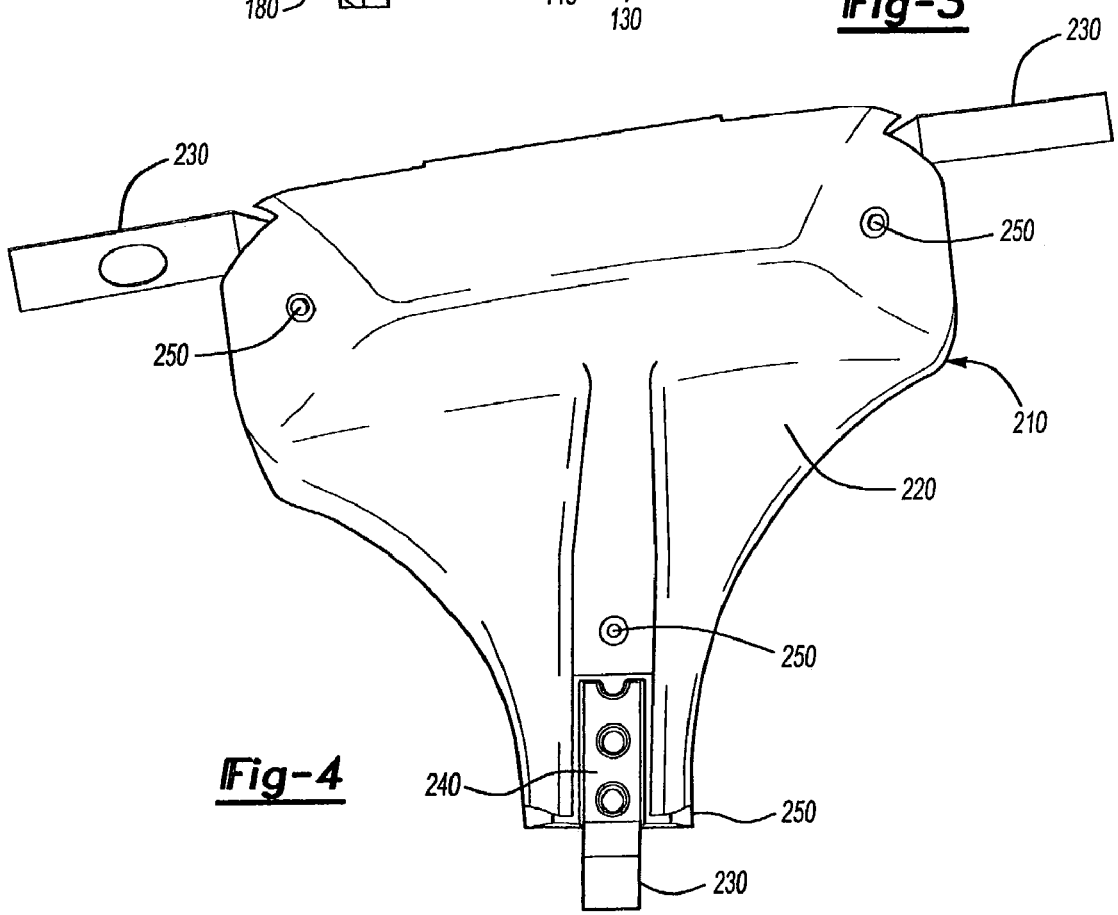
FIG. 4 illustrates another embodiment of an insert of the invention.
Figure 5:
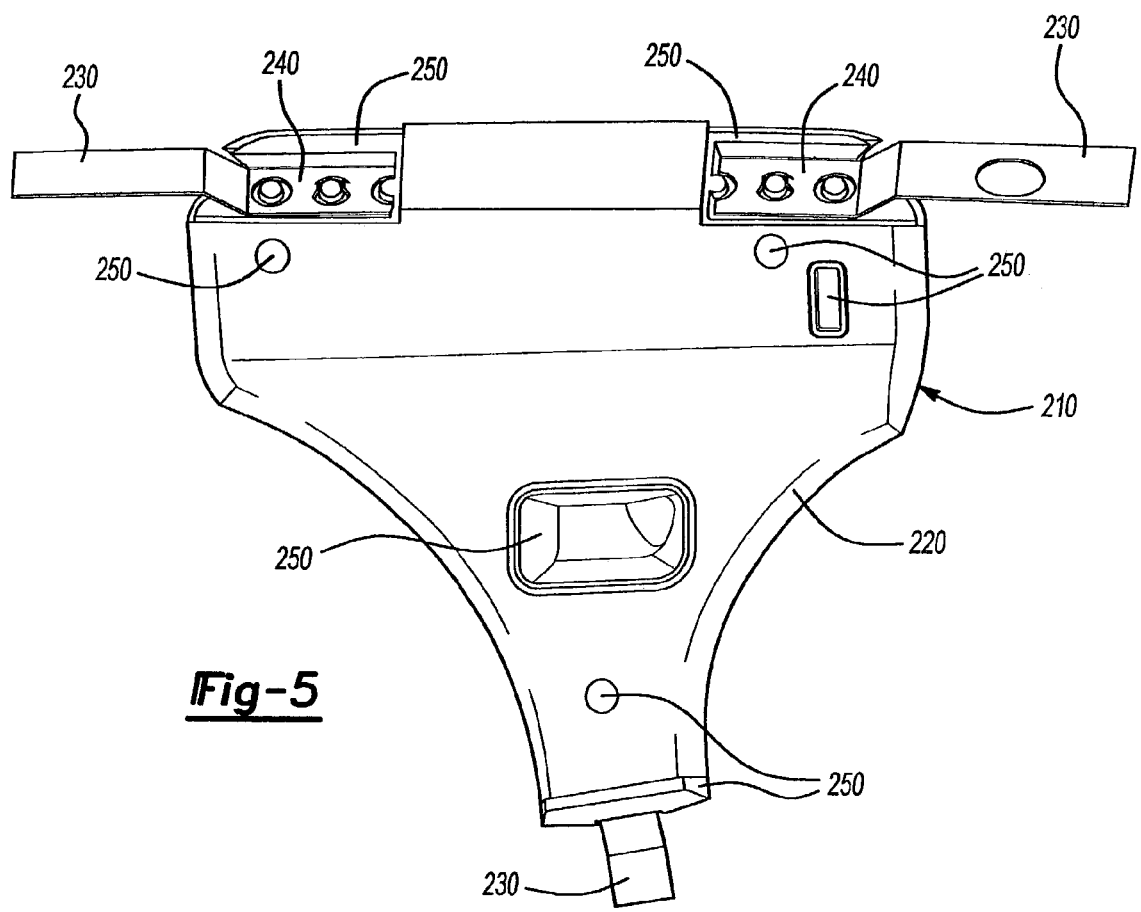
FIG. 5 illustrates a view of the insert illustrated in FIG. 4 from the opposite side.

FIGS. 4 and 5 illustrate two sides of the another embodiment of an insert according to this invention. FIGS. 4 and 5 show a molded insert (210) having adhesive (220) located on a large part of the surface. Three molded in metal tabs (230) are illustrated with locations (240) where the tabs (230) are molded in to the insert (210). There are illustrated a second set of locations (250) of the insert (210) where adhesive does not cover the insert (210). The metal tabs (230) are adapted for welding the insert (210) in place in a hollow member, and thus are the integral locating means.

What is claimed is:

1. A method of forming a foam filled vehicle hollow member comprising,
    (a) inserting a rigid foam insert comprised of a rigid foam having a heat activated expandable adhesive on at least a portion of the rigid foam insert and at least one integral locating pin extending from a surface of the rigid foam into a vehicular hollow member having at least one hole, such that upon inserting, the locating pin of the insert is thrust in the hole in the hollow member resulting in the rigid foam insert being located and held within the hollow member, and
    (b) heating the hollow member having the rigid foam insert therein to a temperature and time sufficient to activate the heat activated expandable adhesive to form the foam filled vehicle hollow member,
    wherein the foam filled hollow member, prior to the heating of step (b), has a temporary drain channel that is defined by a foam insert wall and a vehicular hollow member wall.

2. The method of claim 1 wherein the rigid foam insert has at least one adhesive dam on the surface of the rigid foam insert where said dam, upon expansion of the expandable adhesive, causes at least a portion of the foam insert to be free of the expandable adhesive.

3. The method of claim 1 wherein the foam insert is a polyurethane foam.

4. The method of claim 1 wherein the expandable adhesive is an epoxy adhesive.

5. The method of claim 1 wherein the expandable adhesive is an elastomeric adhesive.

6. The method of claim 5 wherein the elastomeric adhesive is EPDM.

7. The method of claim 1 wherein the foam insert has at least two locating pins.

8. The method of claim 1 wherein the locating pin holds the foam insert in place mechanically.

9. The method of claim 2 wherein the adhesive dam has a height that is essentially the same as the expandable adhesive's thickness.

10. A method of forming a foam filled vehicle hollow member comprising,
    (a) inserting a rigid foam insert comprised of a rigid foam having a heat activated expandable adhesive on at least a portion of the rigid foam insert and at least one integral locating pin extending from a surface of the rigid foam into a vehicular hollow member having at least one hole, such that upon inserting, the locating pin of the insert is thrust in the hole in the hollow member resulting in the rigid foam insert being located and held within the hollow member, and
    (b) heating the hollow member having the rigid foam insert therein to a temperature and time sufficient to activate the heat activated expandable adhesive to form the foam filled vehicle hollow member,
    wherein the vehicular foam filled hollow member has at least one conduit defined by a foam insert wall and a vehicular hollow member wall.

11. A method according to claim 10 wherein the locating means is a molded insert having threads adapted for receiving a screw and the rigid foam insert is engaged with the hollow member by inserting a screw through a hole in the hollow member and screwing the screw into the threaded insert.

12. A method of forming a foam filled vehicle hollow member comprising,
    (a) inserting a rigid foam insert comprised of a rigid foam having a heat activated expandable adhesive on at least a portion of the rigid foam insert and at least one integral locating pin extending from a surface of the rigid foam into a vehicular hollow member having at least one hole, such that upon inserting, the locating pin of the insert is thrust in the hole in the hollow member resulting in the rigid foam insert being located and held within the hollow member, and
    (b) heating the hollow member having the rigid foam insert therein to a temperature and time sufficient to activate the heat activated expandable adhesive to form the foam filled vehicle hollow member,
    wherein the locating pin has an end surface that is a distinctly different color than the foam insert and hollow member.

13. A method of forming a foam filled vehicle hollow member comprising,
    (a) inserting a rigid foam insert comprised of a rigid foam having a heat activated expandable adhesive on at least a portion of the rigid foam insert and at least one integral locating pin extending from a surface of the rigid foam into a vehicular hollow member having at least one hole, such that upon inserting, the locating pin of the insert is thrust in the hole in the hollow member resulting in the rigid foam insert being located and held within the hollow member, and
    (b) heating the hollow member having the rigid foam insert therein to a temperature and time sufficient to activate the heat activated expandable adhesive to form the foam filled vehicle hollow member,
    wherein the locating pin is comprised of a base protruding from the surface of the foam insert, the base having a base surface that has a pinnacle protruding therefrom and the base surface has an adhesive that bonds the insert to the hollow member prior to the heating of step b.

14. The method claim 13 wherein the base surface has a height that is essentially the same as the expandable adhesive's thickness.

15. A method of forming a foam filled vehicle hollow member comprising,
    a) inserting into a hollow member a shaved rigid foam part comprising of a shaved rigid foam having a heat activated expandable adhesive on at least a portion of the rigid foam part and at least one integral locating means extending from a surface of the rigid foam part:
    b) engaging the locating means of the rigid foam part with the hollow member to locate the rigid foam insert in the hollow member; and
    c) heating the hollow member having the rigid foam part therein to a temperature and time sufficient to activate the heat activated expandable adhesive to form the foam filled vehicle hollow member,
    wherein the locating means is a metal tab and the rigid foam is engaged with the hollow member by welding the metal tabs to the hollow member.

16. A method of forming a foam filled vehicle hollow member comprising,
    (a) inserting a rigid foam insert comprised of a rigid foam having a heat activated expandable adhesive on at least a portion of the rigid foam insert and at least one integral locating pin extending from a surface of the rigid foam into a vehicular hollow member having at least one hole, such that upon inserting, the locating pin of the insert is thrust in the hole in the hollow member resulting in the rigid foam insert being located and held within the hollow member, and (b) heating the hollow member having the rigid foam insert therein to a temperature and time sufficient to activate the heat activated expandable adhesive to form the foam filled vehicle hollow member, wherein the rigid foam part is a shaped rigid foam part and the heat activated foamable adhesive is applied directly to at least a portion of the outer surface of the shared rigid foam part and the integral locating means is a shaped indentation or protrusion in the rigid foam part and the rigid foam part further comprises a second integral locating pin which protrudes from the part and which is adapted to locate the rigid foam part in the proper location of the hollow member.

17. A method according to claim 16 wherein the second locating means is a locating pin, a metal tab, a protrusion having pressure-sensitive or a magnet applied thereto, an insert having threads adapted for receiving a screw, or a partially molded in second part wherein the portion of the second part protruding from the rigid foam insert is a mechanically affixing means.

* * * * *